(12) United States Patent
Piippo et al.

(10) Patent No.: US 10,956,938 B2
(45) Date of Patent: *Mar. 23, 2021

(54) METHOD AND APPARATUS FOR ASSOCIATING COMMENTING INFORMATION WITH ONE OR MORE OBJECTS

(71) Applicant: Nokia Technologies Oy, Espoo (FI)

(72) Inventors: Petri Matti Olavi Piippo, Lempaala (FI); Jan Peter Erik Eskolin, Pirkkala (FI); Jussi Severi Uusitalo, Hameenlinna (FI); Tero Juhani Hakala, Kangasala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,191

(22) Filed: May 1, 2017

(65) Prior Publication Data

US 2017/0287003 A1 Oct. 5, 2017

Related U.S. Application Data

(63) Continuation of application No. 13/250,138, filed on Sep. 30, 2011, now Pat. No. 9,639,857.

(51) Int. Cl.
*G06Q 30/02* (2012.01)
*G06F 16/951* (2019.01)

(52) U.S. Cl.
CPC ....... *G06Q 30/0259* (2013.01); *G06F 16/951* (2019.01); *G06Q 30/0276* (2013.01); *G06Q 30/0282* (2013.01)

(58) Field of Classification Search
CPC .......... G06Q 30/0259; G06Q 30/0282; G06Q 30/0276; G06F 17/30864; G06F 16/951
See application file for complete search history.

(56) References Cited

U.S. PATENT DOCUMENTS 5,850,352 A * 12/1998 Moezzi ................ H04N 13/139
345/419
6,285,317 B1 9/2001 Ong
6,563,529 B1 5/2003 Jongerius
(Continued)

FOREIGN PATENT DOCUMENTS

CA 2799443 A1 11/2011
CA 2799444 A1 11/2011
(Continued)

OTHER PUBLICATIONS

Parr, Augmented Wikipedia Reality Has Arrived on the iPhone, Oct. 2, 1 page (Year: 2009).*
(Continued)

*Primary Examiner* — Albert M Phillips, III
(74) *Attorney, Agent, or Firm* — Alston & Bird LLP

(57) ABSTRACT

An approach is provided for presenting a user interface and associating one or more commenting information with on one or more content items detected in one or more media items. Further, a user may associate one or more commenting information related to a point of interest/object wherein one or more content items associated with the point of interest/object may be retrieved and aggregated with the one or more commenting information.

19 Claims, 14 Drawing Sheets

(56) References Cited

U.S. PATENT DOCUMENTS

| | | | |
|---|---|---|---|
| 7,886,024 | B2 | 2/2011 | Kelly et al. |
| 7,995,076 | B2 | 8/2011 | Emam et al. |
| 8,121,999 | B2 | 2/2012 | Hansen et al. |
| 8,589,069 | B1* | 11/2013 | Lehman .............. G01C 21/20 340/995.1 |
| 8,819,719 | B1* | 8/2014 | Chen .............. H04N 21/4788 715/716 |
| 2003/0151592 | A1 | 8/2003 | Ritter |
| 2004/0105573 | A1 | 6/2004 | Neumann et al. |
| 2004/0128070 | A1 | 7/2004 | Schmidt et al. |
| 2005/0001852 | A1 | 1/2005 | Dengler et al. |
| 2005/0116964 | A1 | 6/2005 | Kotake et al. |
| 2006/0174209 | A1 | 8/2006 | Barros |
| 2007/0043748 | A1 | 2/2007 | Bhalotia et al. |
| 2007/0076920 | A1 | 4/2007 | Ofek |
| 2007/0110338 | A1 | 5/2007 | Snavely et al. |
| 2007/0124157 | A1 | 5/2007 | Laumeyer et al. |
| 2007/0162942 | A1 | 7/2007 | Hamynen et al. |
| 2007/0242131 | A1 | 10/2007 | Sanz-Pastor et al. |
| 2008/0033641 | A1 | 2/2008 | Medalia |
| 2008/0111832 | A1 | 5/2008 | Emam et al. |
| 2008/0147730 | A1 | 6/2008 | Lee et al. |
| 2008/0268876 | A1 | 10/2008 | Gelfand et al. |
| 2008/0291279 | A1 | 11/2008 | Samarasekera et al. |
| 2008/0312824 | A1 | 12/2008 | Jung |
| 2009/0061901 | A1 | 3/2009 | Arrasvuori et al. |
| 2009/0070334 | A1* | 3/2009 | Callahan .............. G06F 21/604 |
| 2009/0079587 | A1 | 3/2009 | Satoh |
| 2009/0081959 | A1 | 3/2009 | Gyorfi et al. |
| 2009/0083383 | A1* | 3/2009 | Piper .............. G06Q 10/101 709/206 |
| 2009/0125226 | A1 | 5/2009 | Laumeyer et al. |
| 2009/0167786 | A1 | 7/2009 | Stanions et al. |
| 2009/0215471 | A1 | 8/2009 | Sands et al. |
| 2009/0240431 | A1 | 9/2009 | Chau et al. |
| 2010/0066750 | A1 | 3/2010 | Yu et al. |
| 2010/0095326 | A1* | 4/2010 | Robertson, III .... G11B 27/28 725/40 |
| 2010/0123737 | A1 | 5/2010 | Williamson et al. |
| 2010/0188503 | A1 | 7/2010 | Tsai et al. |
| 2010/0235350 | A1 | 9/2010 | Butler |
| 2010/0245387 | A1 | 9/2010 | Bachelder et al. |
| 2010/0318520 | A1* | 12/2010 | Loeb .............. G06F 17/30038 707/743 |
| 2010/0325563 | A1 | 12/2010 | Goldthwaite et al. |
| 2011/0279453 | A1 | 1/2011 | Murphy et al. |
| 2011/0050699 | A1 | 3/2011 | Dawson et al. |
| 2011/0055175 | A1 | 3/2011 | DeLuca et al. |
| 2011/0071757 | A1* | 3/2011 | Lee .............. G01C 21/20 701/532 |
| 2011/0090221 | A1 | 4/2011 | Ren |
| 2011/0176724 | A1 | 7/2011 | Yang et al. |
| 2011/0196863 | A1 | 8/2011 | Marcucci et al. |
| 2011/0202967 | A1* | 8/2011 | Hecht .............. G11B 27/034 725/114 |
| 2011/0279445 | A1 | 11/2011 | Murphy et al. |
| 2011/0279446 | A1 | 11/2011 | Castro et al. |
| 2011/0279478 | A1 | 11/2011 | Bitra |
| 2012/0001939 | A1 | 1/2012 | Sandberg |
| 2012/0005224 | A1* | 1/2012 | Ahrens .............. H04W 4/21 707/769 |
| 2012/0044163 | A1* | 2/2012 | Sim .............. H04N 1/32144 345/173 |
| 2012/0067954 | A1* | 3/2012 | Moganti .............. H04N 5/232 235/451 |
| 2012/0252353 | A1 | 10/2012 | Cok et al. |
| 2012/0290591 | A1 | 11/2012 | Flynn et al. |
| 2012/0299961 | A1* | 11/2012 | Ramkumar ....... G06F 17/30047 345/632 |
| 2012/0310968 | A1 | 12/2012 | Tseng |
| 2013/0086077 | A1 | 4/2013 | Piippo et al. |
| 2014/0122244 | A1 | 5/2014 | Arrasvuori et al. |
| 2017/0039695 | A1 | 2/2017 | Castro et al. |

FOREIGN PATENT DOCUMENTS

| | | |
|---|---|---|
| CN | 1880918 A | 12/2006 |
| CN | 101379369 A | 3/2009 |
| CN | 102985901 A | 3/2013 |
| CN | 103003847 A | 3/2013 |
| CN | 103119544 A | 5/2013 |
| EP | 0897170 A2 | 2/1999 |
| EP | 1581782 | 10/2005 |
| EP | 1614997 A2 | 1/2006 |
| EP | 2572265 A1 | 3/2013 |
| EP | 2572266 A1 | 3/2013 |
| EP | 2572337 A1 | 3/2013 |
| WO | WO 2005/076149 A1 | 8/2005 |
| WO | WO 2005/103980 A2 | 11/2005 |
| WO | WO 2008/134901 A1 | 11/2008 |
| WO | WO 2010/046123 A1 | 4/2010 |
| WO | WO 2011/144798 A1 | 11/2011 |
| WO | WO 2011/144799 A1 | 11/2011 |
| WO | WO 2011/144800 A1 | 11/2011 |

OTHER PUBLICATIONS

Toto, Augmented Reality App Sekai Camera Goes Multi-Platform. Adds API and Social Gaming, Jul. 14, 10 pages (Year: 2010).*

Cooper, Augmented Reality: 5 Ways it Can Change Your World, Sep. 20, 11 pages (Year: 2011).*

Horowitz, Point your phone to ID places, Sep. 27, 2 pages (Year: 2009).*

TechCrunch, Junaio launches augmented reality platform for the iPhone and the Web, pp. 1-3 (Year: 2009).*

"Google Goggles", From Wikipedia, the free encyclopedia, Retrieved on Sep. 28, 2011, Webpage available at: http://en.wikipedia.org/wiki/Google_Goggles.

Buchmann et al., "FingARtips—Gesture Based Direct Manipulation in Augmented Reality," 2004, ACM, Proceedings of the 2nd International Conference on Computer Graphics and Interactive Techniques in Australasia and South East Asia, p. 212-221.

Ji et al., "A Low Bit Rate Vocabulary Coding Scheme for Mobile Landmark Search", IEEE International Conference on Acoustics, Speech and Signal Processing, May 22-27, 2011, pp. 2316-2319.

Milgram, "A Taxonomy of Mixed Reality Visual Displays," Dec. 1994, IEICE Transactions on Information Systems, vol. E77-D, No. 12.

Schmalstieg et al., "Demand-Driven Geometry Transmission for Distributed Virtual Environments," 1996, Blackwell Publishers, Eurographics '96, vol. 15, No. 3, p. 421-432.

International Search Report and Written Opinion of the International Searching Authority for Patent Cooperation Treaty Application No. PCT/FI2011/050124, dated Jun. 8, 2011, 12 pages.

International Search Report and Written Opinion of the International Searching Authority for Patent Cooperation Treaty Application No. PCT/FI2011/050125, dated Jun. 15, 2011, 13 pages.

International Search Report and Written Opinion of the International Searching Authority for Patent Cooperation Treaty Application No. PCT/FI2011/050126, dated Jul. 1, 2011, 13 pages.

Canada Office Action for corresponding Canadian Application No. 2,799,443, dated Mar. 31, 2014, 3 pages.

Canada Office Action for related Canadian Patent Application No. 2,799,444 dated Oct. 2, 2014, 3 pages.

Chinese Office Action for corresponding Chinese Application No. 201180034805.2, dated Oct. 10, 2014, 8 pages (English Language Summary Included).

Chinese office Action for related Chinese Patent Application No. 201180034828.3 dated Dec. 18, 2014, with English-language, 8 pages.

Chinese office Action for related Chinese Patent Application No. 201180034665.9 dated Mar. 23, 2015, with English-language summary, 9 pages.

Canada Office Action for related Canadian Patent Application No. 2,799,443 dated Apr. 13, 2015, 4 pages.

Chinese office Action for related Chinese Patent Application No. 201180034805.2 dated Jun. 18, 2015, with English-language summary, 8 pages.

(56) References Cited

OTHER PUBLICATIONS

Canadian Office Action for related Canadian Patent Application No. 2,799,444 dated Jul. 14, 2015, 4 pages.
Chinese office Action for related Chinese Patent Application No. 201180034665.9 dated Nov. 17, 2015, with English-language summary, 6 pages.
Chinese office Action for related Chinese Patent Application No. 201180034805.2 dated Jan. 8, 2016, with English-language summary, 4 pages.
Canadian Office Action for related Canadian Patent Application No. 2,799,444 dated May 30, 2016, 4 pages.
Chinese office Action for related Chinese Patent Application No. 201180034805.2 dated Jul. 19, 2016, with English-language summary, 7 pages.
Non-Final Office Action for U.S. Appl. No. 13/250,138, dated Aug. 22, 2013, 10 pages.
Final Office Action for U.S. Appl. No. 13/250,138, dated Dec. 6, 2013, 17 pages.
Non-Final Office Action for U.S. Appl. No. 13/250,138, dated Sep. 30, 2014, 15 pages.
Final Office Action for U.S. Appl. No. 13/250,138, dated Mar. 5, 2015, 18 pages.
Non-Final Office Action for related U.S. Appl. No. 12/780,912 dated May 8, 2012, 15 pages.
Final Office Action for related U.S. Appl. No. 12/780,912 dated Aug. 24, 2012, 14 pages.
Non-Final Office Action for related U.S. Appl. No. 12/780,912 dated Mar. 6, 2013, 12 pages.
Final Office Action for related U.S. Appl. No. 12/780,912 dated Sep. 16, 2013, 14 pages.
Non-Final Office Action for related U.S. Appl. No. 12/780,912 dated Feb. 24, 2014, 16 pages.
Final Office Action for related U.S. Appl. No. 12/780,912 dated Jul. 21, 2014, 18 pages.
Non-Final Office Action for related U.S. Appl. No. 12/780,913 dated May 15, 2012, 11 pages.
Final Office Action for related U.S. Appl. No. 12/780,913 dated Oct. 5, 2012, 13 pages.
Non-Final Office Action for related U.S. Appl. No. 12/780,913 dated May 20, 2013, 10 pages.
Final Office Action for related U.S. Appl. No. 12/780,913 dated Aug. 13, 2013, 11 pages.
Non-Final Office Action for related U.S. Appl. No. 12/780,913 dated Dec. 17, 2013, 11 pages.
Final Office Action for related U.S. Appl. No. 12/780,913 dated Apr. 30, 2014, 14 pages.
Non-Final Office Action for related U.S. Appl. No. 12/780,913 dated Sep. 25, 2014, 12 pages.
Final Office Action for related U.S. Appl. No. 12/780,913 dated Mar. 12, 2015, 10 pages.
Non-Final Office Action for related U.S. Appl. No. 12/780,914 dated May 3, 2012, 15 pages.
Final Office Action for related U.S. Appl. No. 12/780,914 dated Aug. 23, 2012, 16 pages.
Non-Final Office Action for related U.S. Appl. No. 12/780,914 dated Aug. 8, 2013, 18 pages.
Final Office Action for related U.S. Appl. No. 12/780,914 dated Dec. 17, 2013, 21 pages.
Substantive Examination Report for Philippine Patent Application No. 1/2012/502245, dated Mar. 8, 2017, 2 pages.
Office Action for U.S. Appl. No. 15/295,749, dated Feb. 9, 2017, 7 pages.
Notice of Allowance for corresponding U.S. Appl. No. 13/250,138, dated Jan. 10, 2017, 9 pages.
Non-Final Office Action for U.S. Appl. No. 13/250,138, dated Jul. 29, 2015, 9 pages.
Final Office Action for U.S. Appl. No. 13/250,138, dated Feb. 9, 2016, 12 pages.
Office Action for U.S. Appl. No. 12/780,912, dated Apr. 11, 2017, 16 pages.
Office Action for U.S. Appl. No. 12/780,912, dated Jul. 21, 2014, 18 pages.
Dahne, Patrick et al., "Archeoguide: System architecture of a mobile outdoor augmented reality system". Mixed and Augmented Reality, 2002. ISMAR 2002. Proceedings. International Symposium on. IEEE, 2002.
Extended European Search Report for European Patent Application No. 11783126.3 dated Feb. 13, 2018, 8 pages.
Extended European Search Report for European Patent Application No. 11783127.1 dated Dec. 19, 2017, 8 pages.
Extended European Search Report for European Patent Application No. 11783128.9 dated Dec. 19, 2017, 7 pages.
Final Office Action for related U.S. Appl. No. 12/780,912 dated Aug. 24, 2017.
Guven et al., A hypermedia authoring tool for augmented and virtual reality, New Review of Hypermedia and Multimedia, vol. 9, Issue 1, Jan. 2003, pp. 89-116.
Maass et al., "Dynamic Annotation of Interactive Environments using Object-Integrated Billboards", 2006, in 14th Int. Conf. in Central Europe on Computer Graphics, Visualization and Computer Vision, retrieved on Nov. 10, 2017 from http://citeseerx.ist.psu.edu/viewdoc/download?doi=10.1.1.142.893&rep=rep1&type=pdf, 8 pages.
Notice of Allowance for related U.S. Appl. No. 12/780,912 dated Jan. 11, 2018.
Notice of Allowance for U.S. Appl. No. 15/295,749 dated Oct. 26, 2017.
Office Action for related Chinese Patent Application No. 201180034805.2, dated Mar. 6, 2017, English Language Summary included, 7 pages.
Office Action for U.S. Appl. No. 15/295,749 dated Aug. 11, 2017.
Office Action for U.S. Appl. No. 15/489,293 dated May 15, 2018.
Partial Supplementary European Search Report for European Patent Application No. 11783126.3 dated Nov. 13, 2017, 8 pages.
Vlahakis, Vassilios, et al., "3D interactive, on-site visualization of ancient Olympia." 3D Data Processing Visualization and Transmission, 2002. Proceedings. First International Symposium on. IEEE, 2002, 9 pages.

* cited by examiner

METHOD AND APPARATUS FOR ASSOCIATING COMMENTING INFORMATION WITH ONE OR MORE OBJECTS

BACKGROUND

Service providers and device manufacturers (e.g., mobile devices, personal computers, terminals, etc.) are continually challenged to deliver value and convenience to consumers by, for example, providing compelling network services. One area of interest has been the development of services for generating commenting, ranking, and/or ratings information about content and/or information encountered over the Internet such as search results (e.g., results related to searches for businesses, content, objects, etc.). However, as the amount of content and information available to users increases, users are continuously challenged with finding, sorting or ranking the content and/or the associated information in an efficient manner such that the information may be shared with other users and/or re-used by the user at a later time.

SOME EXAMPLE EMBODIMENTS

Therefore, there is a need for an approach for users to efficiently and effectively associate one or more commenting and/or ranking information with a content item, an object and/or information.

According to one embodiment, a method comprises processing and/or facilitating a processing of one or more media items to cause, at least in part, a detection of one or more objects in the one or more media items. The method also comprises causing, at least in part, an association of commenting information with the one or more objects, wherein the commenting information is associated with at least one user. The method further comprises determining to store the commenting information, the one or more media items, one or more portions of the one or more media items depicting the one or more objects, or a combination thereof for responding to one or more requests for information regarding the one or more objects.

According to another embodiment, an apparatus comprising at least one processor, and at least one memory including computer program code, the at least one memory and the computer program code configured to, with the at least one processor, cause, at least in part, the apparatus to process and/or facilitate a processing of one or more media items to cause, at least in part, a detection of one or more objects in the one or more media items. The apparatus is further caused to cause, at least in part, an association of commenting information with the one or more objects, wherein the commenting information is associated with at least one user. Furthermore, the apparatus is caused to determine to store the commenting information, the one or more media items, one or more portions of the one or more media items depicting the one or more objects, or a combination thereof for responding to one or more requests for information regarding the one or more objects.

According to another embodiment, a computer-readable storage medium carrying one or more sequences of one or more instructions which, when executed by one or more processors, cause, at least in part, an apparatus to, at least in part, process and/or facilitate a processing of one or more media items to cause, at least in part, a detection of one or more objects in the one or more media items. The apparatus is further caused to cause, at least in part, an association of commenting information with the one or more objects, wherein the commenting information is associated with at least one user. Furthermore, the apparatus is caused to determine to store the commenting information, the one or more media items, one or more portions of the one or more media items depicting the one or more objects, or a combination thereof for responding to one or more requests for information regarding the one or more objects.

According to another embodiment, an apparatus comprises means for processing and/or facilitating a processing of one or more media items to cause, at least in part, a detection of one or more objects in the one or more media items. The apparatus also comprises means for causing, at least in part, an association of commenting information with the one or more objects, wherein the commenting information is associated with at least one user. The apparatus further comprises means for determining to store the commenting information, the one or more media items, one or more portions of the one or more media items depicting the one or more objects, or a combination thereof for responding to one or more requests for information regarding the one or more objects.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for associating one or more commenting information with on one or more content items detected in one or more media items. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
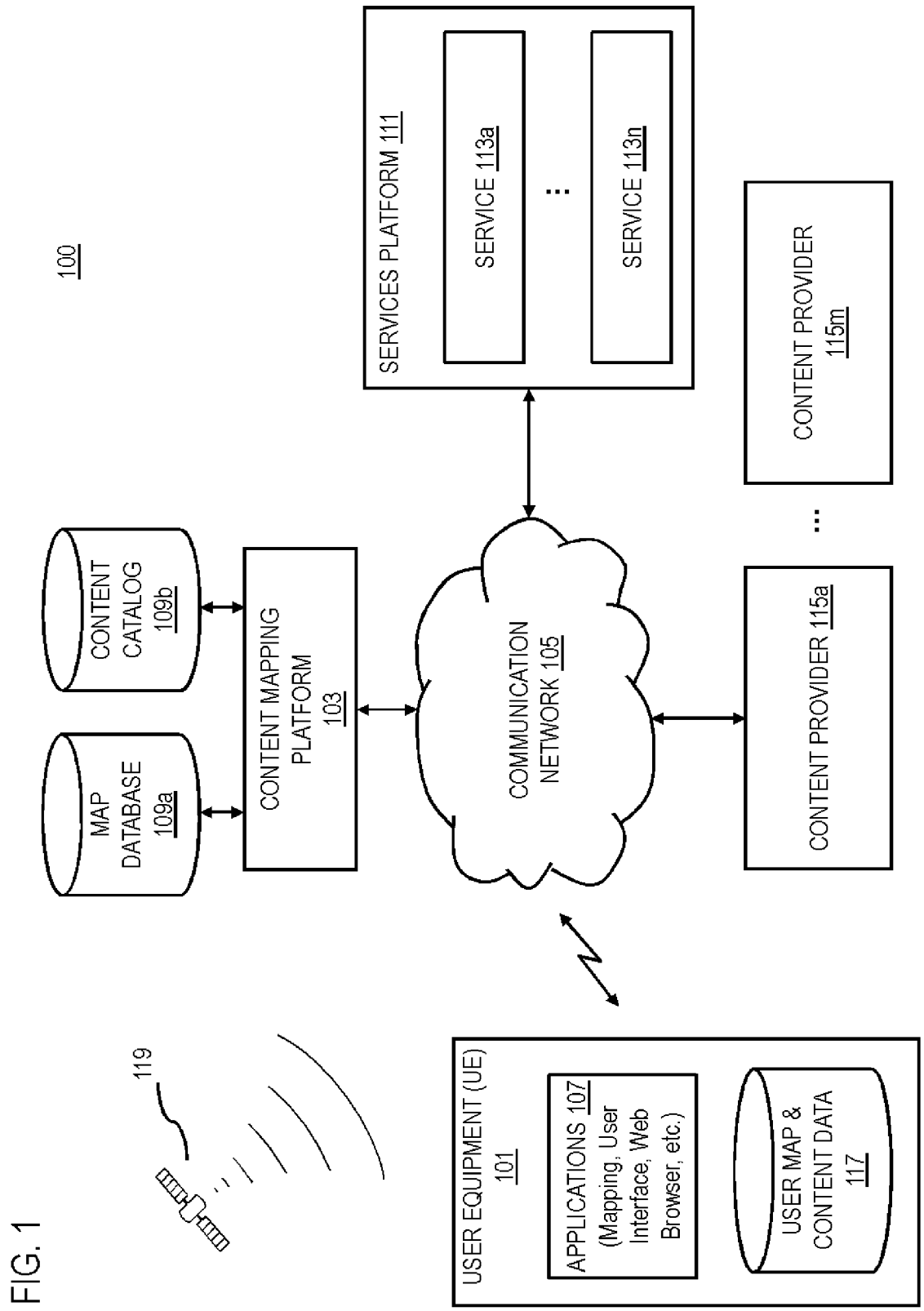
FIG. 1 is a diagram of a system capable of presenting a user interface for associating one or more commenting and/or ranking information with one or more content items detected in one or more media items, according to one embodiment.

FIG. 1 is a diagram of a system capable of presenting a user interface for associating one or more commenting and/or ranking information with one or more content items detected in one or more media items, according to one embodiment. It is noted that mobile devices and computing devices in general are becoming ubiquitous in the world today and with these devices, many services are being provided. These services can include, search engines, location-based services, augmented reality (AR) and mixed reality (MR), services and applications. Search results and/or content items at a user device in conjunction with AR allow a user's view of the real world to be overlaid with additional visual information associated with the search results and/or the content items wherein the user may further add and/or associate additional user information (e.g., rankings, comments, etc.). Similarly, MR enables a unique presentation of search results and related information by allowing for the merging of real and virtual worlds to produce visualizations and new environments. In MR, physical and digital objects can co-exist and interact in real time. Thus, MR can be a mix of reality, AR, virtual reality, or a combination thereof.

A benefit of using such applications allows for the association of user defined information (e.g., rankings, comments, observations, etc.) with a content item and/or point of interest (POI) (e.g., a business, a building, an object, a location, etc.) This user defined information may be shared with others or kept for a user to remind the user of the content item/POI. Typically, the more accurately the user information (e.g., ranking, comment, etc.) is associated with a content item, the more useful the information will be when sharing and/or re-using the information. As such, the user defined information associated with a content item may be utilized when presenting and/or sorting search results, which may increase the potential of a better match to what the user is searching for and/or would be inclined to utilize and/or share with one or more other users. Alternatively, the user defined information can provide to the user and/or to other users a quick indication of previous preferences, rankings and/or comments associated with the one or more content items. As such, technical challenges arise in determining and associating the one or more content items with the user defined commenting information.

To address these problems, a system 100 of FIG. 1 introduces the capability to associate one or more commenting information with one or more content items detected in one or more media items. As shown in FIG. 1, a user may utilize a user equipment (UE) 101 to capture and/or retrieve a media item including an image of a target (e.g., a point of interest (POI), an object, a building, etc.). Further, the media item and/or related information (e.g., contextual, location, type, etc.) may be presented to services platform 111, content provider 115a-115m (also collectively known as content provider 115) and/or content mapping platform 103 via a communication network 105. The content and mapping information can be used by applications 107 on the UE 101 (e.g., a mapping application, a navigation application, etc.) to render a view of the target on a mapping application. In the example of FIG. 1, the content mapping platform 103 stores mapping information in the map database 109a and content information in the content catalog 109b. By way of example, the mapping information includes digital maps, GPS coordinates, prerecorded views, geo-tagged data, POI data, or a combination thereof. Further, the content information includes one or more identifiers, metadata, access addresses (e.g., network address such as a Uniform Resource Locator (URL) or an Internet Protocol (IP) address; or a local address such as a file or storage location in a memory of the UE 101, description, or the like associated with the content. In one embodiment, content includes live media (e.g., streaming broadcasts), stored media (e.g., stored on a network or locally), metadata associated with media, text information or a combination thereof. The content may be provided by the services platform 111 which includes one or more services 113a-113n (e.g., music service, mapping service, video service, social networking service, content broadcasting service, etc.), the content provider 115 (e.g., online content retailers, public databases, etc.) and/or other content sources available or accessible over the communication network 105.

Additionally or alternatively, in certain embodiments, a user map and content data 117 of the UE 101 may be utilized in conjunction with the applications 107 to present content information, location information (e.g., mapping and navigation information), ranking information, user comments, etc. to the user. The user may be presented with a user interface associated with the applications 107 and/or the content mapping platform allowing 3D objects or other representations of the content and related information to be superimposed onto an image of a physical environment on the UE 101.

By way of example, the UE 101 may execute the applications 107 to receive content and/or mapping information from the content mapping platform 103 or other components of the communication network 105. As mentioned above, the UE 101 may utilize GPS satellites 119 and/or assisted GPS (A-GPS) to determine the location of the UE 101 to utilize the content mapping functions of the content mapping platform 103 and/or the applications 107, and the map information stored in the map database 109a may be created from live camera views of real-world targets (e.g., buildings, POIs, etc.) and/or other sites. As such, the content can be augmented into prerecorded views and/or live camera views of real world locations (e.g., based on location coordinates such as GPS and/or A-GPS coordinates). Map information may include maps, satellite images, street and path information, point of interest (POI) information, signing information associated with maps, objects and structures associated with the maps, information about people and the locations of people, coordinate information associated with the information, etc., or a combination thereof. A POI can be a specific point location that a person may, for instance, find interesting or useful. Examples of POIs can include an airport, a bakery, a dam, a landmark, a restaurant, a hotel, a building, a park, the location of a person, or any point interesting, useful, or significant in some way.

In one embodiment, one or more media items are captured and/or retrieved and one or more objects are detected in the one or more media items. For example, a user may utilize the UE 101 to capture a media item (e.g., an image) of a POI/object wherein the applications 107 and/or a service provider (e.g., services platform 111 and/or at the content provider 115) can detect one or more objects (e.g., a building, a car, a café, a bar, etc.) in the media item. In another embodiment, the applications 107 and/or the service provider can present a user interface on the UE 101 whereby the user is able to enter and associate one or more commenting information with the one or more objects in the media item. In another embodiment, the applications 107, the user and/or the service provider determine how and where to store the commenting information, the one or more media items, one or more portions of the one or more media items depicting the one or more objects, or a combination thereof for responding to one or more requests for information regarding the one or more objects. In one embodiment, one or more requests are made via one or more services and/or one or more applications. For example, a user may utilize a search application and submit the search request to services platform 111. In another example, a media item and its associated one or more commenting information may be stored at a local storage user map & content data 117 for future use. In another embodiment, the media item and the associated one or more commenting information are stored at a remote storage device such as the content catalog 109b and/or at the services platform 111 and/or at the content provider 115. In various embodiments, the user may further associate one or more sharing, security and/or privacy policies with one or more portions of the media item and/or the commenting information.

In various embodiments, the one or more requests may be presented by the user (e.g., a user who has provided commenting information), one or more other users (e.g., friends of the user) or a combination thereof wherein the services platform 111 and/or the content provider 115 can present (e.g., send, provide, transmit) the commenting information, the one or more media items, the one or more portions of the one or more media items, or a combination thereof. In one embodiment, the services platform 111 and/or at the content provider 115 may process one or more information (e.g., social networking information, one or more social graphs, etc.) associated with the one or more other users in order to determine one or more information related to the one or more other users are (e.g., identity, login name, account information, location, etc.)

In another embodiment, the commenting information, the one or more media items, the one or more portions of the one or more media items, or a combination thereof are aggregated with other information related to the one or more objects, wherein the other information is obtained from one or more service providers. For example, the commenting information may include ranking and comments, by the user, which are associated with one or more objects can be aggregated with other information (e.g., available publicly and/or from other users) related to the one or more objects. Further, one or more portions of the aggregated information and/or media items can be shared with one or more other users, groups, service provider and the like.

In one embodiment, the applications 107, the services platform 111 and/or the content provider 115 can utilize the commenting information to determine the other information (e.g., available publicly or from other users), or a sort order for presenting the other information, or a combination thereof. For example, a commenting information may include information provided by a user which may have been aggregated with other information retrieved form a service provider and/or another user wherein the aggregated information can be processed (e.g., by the applications 107 and/or a service provider) to ascertain source of the one or more information and to further sort and present the aggregated information in an order determined by a user, by a service provider, by an application and the like. For example, a user may wish to receive and/or view results of a search for a POI based, at least in part, on the ranking provided by a friend.

In one embodiment, the user, the services platform 111 and/or the content provider 115 can determine and/or associate one or more privacy policies and/or one or more security policies with the commenting information, the one or more media items, the one or more portions of the one or more media items, the at least one user, the one or more other users and the like. In another embodiment, the presentation of the commenting information, the one or more media items and/or the one or more portions of the one or more media items is based, at least in part, on the one or more privacy policies and/or the one or more security policies. For example, a user may identify (e.g., tag, mark, amend) one or more objects and/or one or more commenting information (e.g., that he created) as private (e.g., not to be share with others). In another example, a user may identify another user who may access the one or more commenting information, the one or more media items, the one or more portions of the one or more media items. In another example, a service provider may provide access rights to one or more users based, at least in part, on membership, paid fees, group association and the like.

In one embodiment, the applications 107 can detect a capture and/or an access of the one or more media items and can further present a user interface for inputting the commenting information. For example, a user takes a picture of a building of a café and identifies the café (e.g., marks, highlights, selects, etc.) as a point of interest (POI) and/or an object for a possible search for content/information. Further, the applications 107 presents a user interface (e.g., a graphical user interface, GUI) including options/methods for the user to associate one or more commenting information (e.g., comments, ranking, location information, etc.) with the POI/object in the picture. In various embodiments, the commenting information includes, at least in part, a ranking, one or more comments, a numerical grade, a textual grade, or a combination thereof. For example, the commenting information may include comment text providing description about the POI/object (e.g., good food at the café, good service, good prices, etc.) In various embodiments, the commenting information may include a numerical grade/ranking (e.g., 1 out of 4, 1 star out of 5 stars, etc.), textual grade (e.g., "A", "C", "F", etc.) and the like.

In one embodiment, the one or more requests are made via one or more services, one or more applications, or a combination thereof.

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.)

By way of example, the UE 101, and content mapping platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the applications 107, the services platform 111 and/or the content mapping platform 103 may interact according to a client-server model, so that the applications 107 of the UE 101 requests mapping and/or content data from the services platform 111 and/or the content mapping platform 103 on demand. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
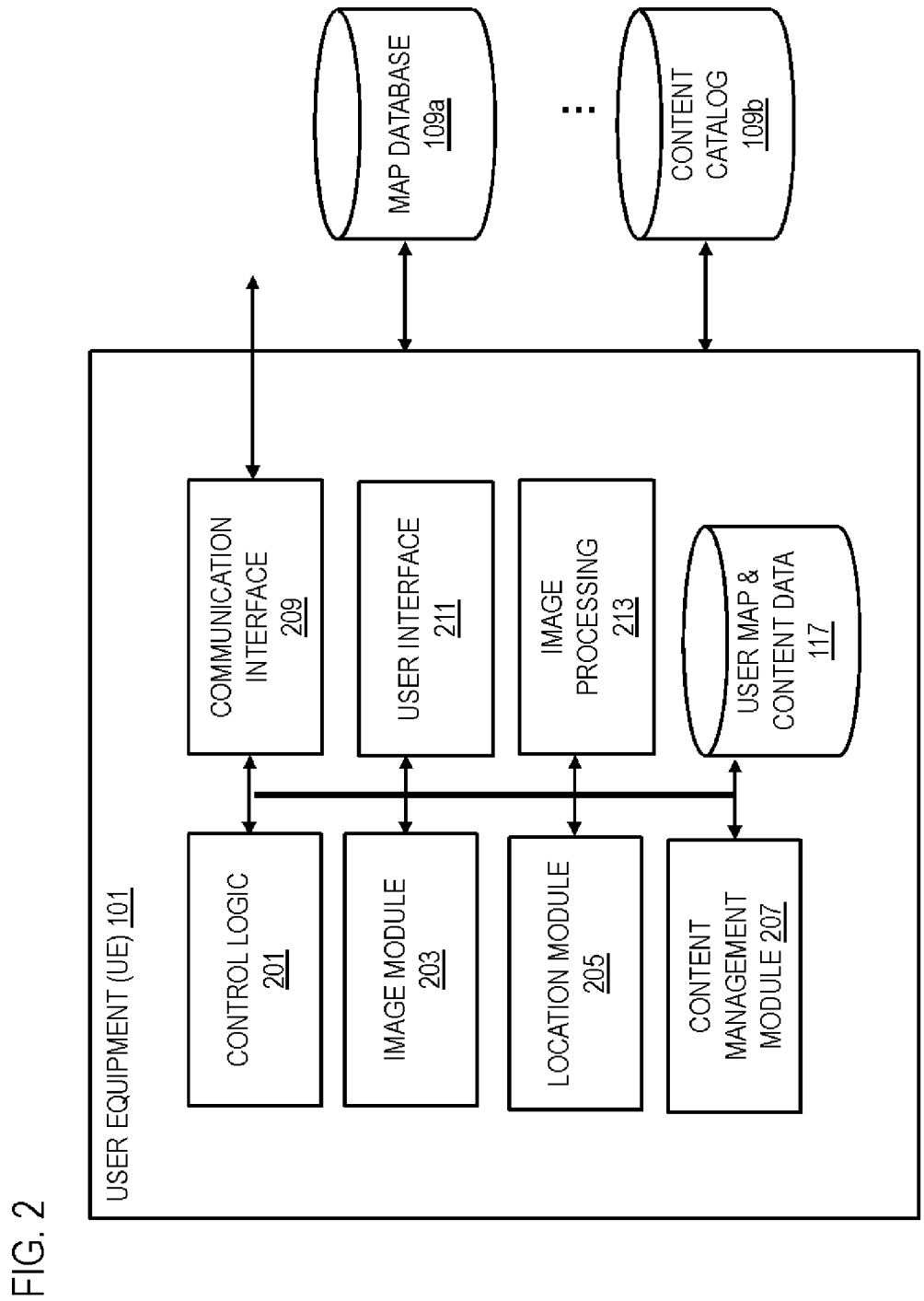
FIG. 2 is a diagram of the components of a user equipment, according to one embodiment.

FIG. 2 is a diagram of the components of a user equipment, according to one embodiment. By way of example, the content mapping and applications 107 includes one or more components for mapping, searching for, capturing and/or retrieving media items, content and/or information related to the media items. It is contemplated that the functions of these components may be combined in one or more components or performed by other components of equivalent functionality. In one embodiment, the UE 101 includes at least a control logic 201 which executes at least one algorithm for executing functions of the applications 107. For example, the control logic 201 interacts with an image module 203 to enable a user to capture a live camera view of a target at a current location of the UE 101 (e.g., "Mario's Restaurante"). The image module 203 may include a camera, a video camera, a combination thereof, etc. In one embodiment, visual media is captured in the form of an image or a series of images. Further, these images may be processed by an image processing module 213 to include media items retrieved from a services platform 111. The image processing module 213 may be implemented via one or more processors, graphics processors, etc. In certain embodiments, the image processing 213 can be a means for determining one or more images.

Next, the control logic 201 interacts with a location module 205 to retrieve location data of the current location of the UE 101. In one embodiment, the location data may include addresses, geographic coordinates (e.g., GPS coordinates) or other indicators (e.g., longitude and latitude information) that can be associated with a current location. For example, the location data may be manually entered by the user (e.g., entering an address or title, clicking on a digital map, etc.) or extracted or derived from any geo-tagged data. It is contemplated that the location data or geo-tagged data could also be created by the location module 205 by deriving the location associated metadata such as media titles, tags, and comments. More specifically, the location module 205 can parse the metadata for any terms that indicate association with a particular location.

In one embodiment, the location module 205 determines the user's location by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 205 may also utilize multiple technologies to detect the location of the UE 101. GPS coordinates can provide finer detail as to the location of the UE 101. As previously noted, the location module 205 may be utilized to determine location coordinates for use by the applications 107 and/or the content mapping platform 103.

The control logic 201 then interacts with a content management module 207 and the image module 203 to augment content information related to one or more targets (e.g., POIs) in one or more media items. The target and/or content may be received from the services platform 111, the content provider 115, other like components, or a combination thereof. It is also contemplated that the user may utilize the UE 101 to capture a target. In one embodiment, the content management module 207 may create a content catalog listing all content items and associated access addresses and/or pointers provided to the content management module 207. In certain embodiments, the content catalog may include additional descriptive information and other metadata describing the content. The available media content or stream can take many forms (e.g., live video feeds, photographs, audio files, etc.) and can be delivered using any number means (e.g., streaming media, downloaded media, spontaneously created media, etc.). The content management module 207 includes one or more sub-modules or application programming interfaces (APIs) for receiving and/or detecting the media content in its native format or for converting the media content to a media format compatible with the applications 107 (e.g., mapping). In other embodiments, the content management module 207 may initiate a download or installation of the components (e.g., codecs, player applications, etc.) needed to verify the content or stream. The content data can be cached or saved in the user map and content data 117. Additionally, to facilitate finding specific content or features, the content management module 215 enables the user to input search criteria (e.g., a content item, person, city, weather, etc.) and to get guidance for finding the direction where the searched content item is located in the real physical world.

In one embodiment, the communication interface 209 can be used to communicate with a location services platform 111 or other UEs 101. Certain communications can be via methods such as an internet protocol, messaging (e.g., SMS, MMS, etc.), or any other communication method (e.g., via the communication network 105). In some examples, the UE 101 can send a request to the services platform 111 via the communication interface 209. The services platform 111 may then send a response back via the communication interface 209.

The target and related content can be depicted as a thumbnail overlaid on the user interface map at the location corresponding to a point of interest (e.g., a floor) or a portion of the point of interest (e.g., facilities on the floor), and affixed to the POI at a fixed 3D orientation. As discussed, the user interface may be a graphical user interface. In addition or alternatively, the user interface may be an audio or tactile interface.

In certain embodiments, the user map and content data 117 includes all or a portion the information in the map database 109a and the content catalog 109b. From the selected viewpoint, a live image view augmented with the content can be provided on the screen of the UE 101. In certain embodiments, the content management nodule 215 provides a correlated prerecorded panoramic view from the selected view point with content generated or retrieved from the user map and content data 117 or the content mapping platform 103. The content information can be embedded/tagged in the correlated prerecorded panoramic view previously by another apparatus or by the content management module 207 on demand and/or in a real time manner when displays the correlated prerecorded panoramic view on the screen of the UE 101.

Content and mapping information may be presented to the user via a user interface 211, which may include various methods of communication. For example, the user interface 211 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start the applications 107 (e.g., a mapping and user interface application) and utilize the user interface 211 to receive content and mapping information. Through the user interface 211, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101. As mentioned, the UE 101 communicates with the content mapping platform 103 services platform 111, and/or content provider 115 to fetch content, mapping, and or location information. The UE 101 may utilize requests in a client server format to retrieve the content and mapping information. Moreover, the UE 101 may specify location information and/or orientation information in the request to retrieve the content and mapping information.

Figure 3:
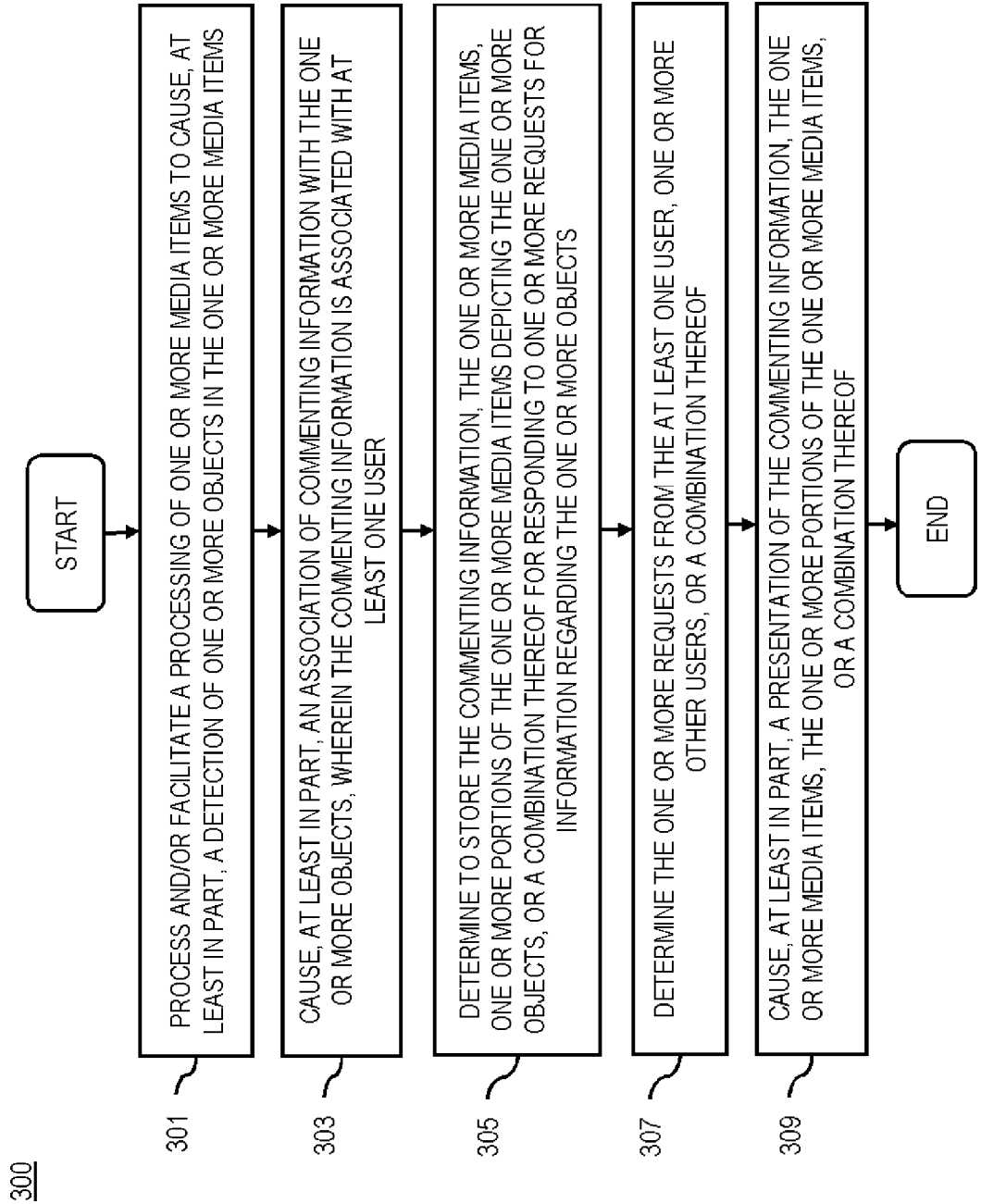
FIG. 3 is a flowchart of a process for detecting one or more objects in one or more media items and associating one or more comments with the one or more objects, according to one embodiment.
Figure 8:
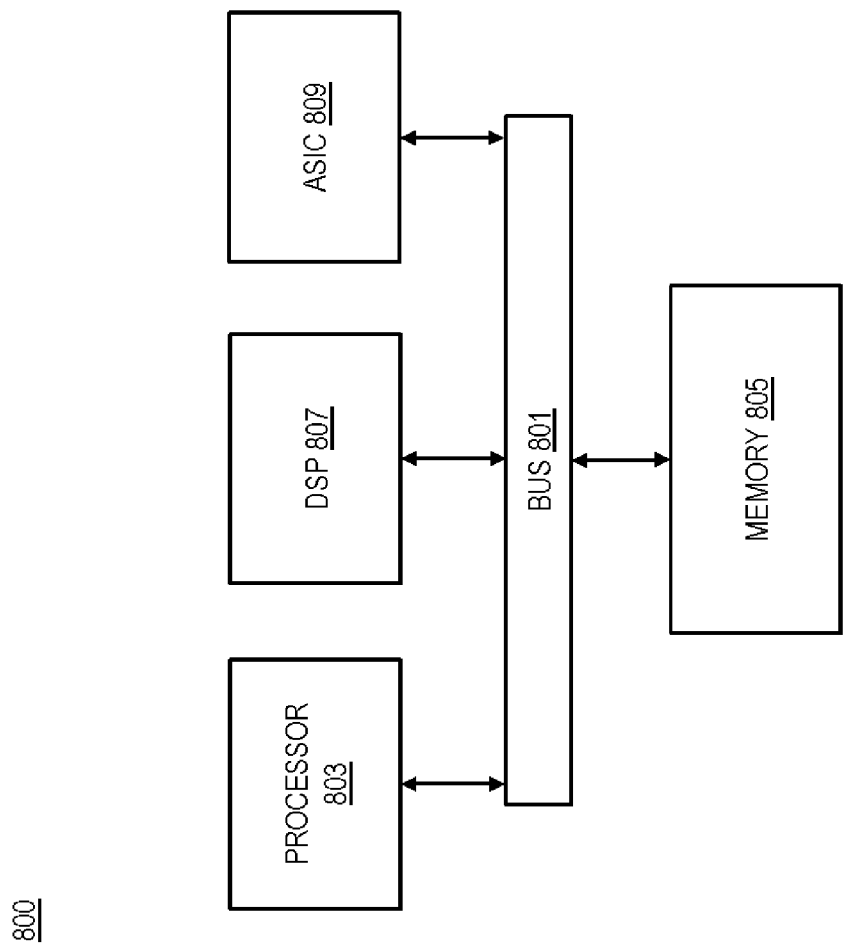
FIG. 8 is a diagram of a chip set that can be used to implement an embodiment of the invention.

FIG. 3 is a flowchart of a process for detecting one or more objects in one or more media items and associating one or more comments with the one or more objects, according to one embodiment. In one embodiment, the applications 107 and/or the services platform 111 performs the process 300 and is implemented in, for instance, a chip set including a processor and a memory as shown in FIG. 8. As such, the applications 107 and/or control logic 201 can provide means for accomplishing various parts of the process 300 as well as means for accomplishing other processes in conjunction with other components of the UE 101 and/or services platform 111.

In step 301, the applications 107 processes and/or facilitates a processing of one or more media items to cause, at least in part, a detection of one or more objects in the one or more media items. In one embodiment, a user utilizes the UE 101 to submit one or more media items, for example to the services platform 111 and/or to the content provider 115, for determining one or more objects in the one or more media items. In various embodiments, the user may utilize the UE 101 to capture the one or more media items, to retrieve the one or more media items from a local; user map and content data 117; or a remote storage device content catalog 109*b*, receive it from another user, and/or from other sources available to the user wherein the retrieval can include a transmission of a request for the one or more media items and a receipt of the one or more media items. In another embodiment, the UE 101 utilizes applications 107 to process, at least in part, the one or more media items in order to determine the one or more objects. In other various embodiments, the services platform 111 and/or the content provider 115 can provide the one or more media items based on a location of the UE 101 wherein the location can be determined based on the location module 205 and/or other components of the UE 101 or based on input by the user (e.g., entering a zip code and/or address). Further, the input can include a selection of the content and an option to alter or augment the content. This option can be provided to the user based on a permission associated with the content. For example, if the content requires a certain permission to alter the content, the user may be required to provide authentication information to update the content. The content can be manipulated by changing text associated with the content, a location or point(s) associated with the content, commenting on the content, removing part of the content, replacing the content (e.g., replace a video with all image, another video, etc.), a combination thereof, etc.

Then, at step 303, the applications 107 causes, at least in part, an association of commenting information with the one or more objects, wherein the commenting information is associated with at least one user. In one embodiment, a user associates (e.g., uploads, writes, attaches, selects, links, etc.) one or more information items, via the applications 107, with the one or more objects. For example, a user has an image of a restaurant (e.g., an image of its building, its dining area, etc.) and wishes to write one or more comments related to the user's experience (e.g., quality of service, food, ambiance, establishment, etc.) at the restaurant. Additionally, the user call rank the restaurant (e.g., give a number of stars, a numerical value, a letter grade, etc.), via the applications 107, based on the user's experience and/or other information available to the user. In another embodiment, based on the user interface, the user can select a point or multiple points on the user interface (e.g., via a touch enabled input) wherein the input can be via a touch enabled input, a scroll and click input, or any other input mechanism.

In step 305, the services platform 111 determines to store the commenting information, the one or more media items, one or more portions of the one or more media items depicting the one or more objects, or a combination thereof for responding to one or more requests for information regarding the one or more objects. In one embodiment, the user, the services platform 111 and/or the content provider can determine where to store the user's commenting information. In one embodiment, the user wishes to store the commenting information at the UE 101 (e.g., user map and content data 117) for future reference. In another embodiment, the user wishes to store the commenting information at the services platform 111 for future reference, for sharing with other users and/or services or a combination thereof. For example, the user may allow sharing of the commenting information with one or more specified users or group of users (e.g., at a social networking group), with one or more service providers (e.g., identified by the user or the services platform 111), content providers and the like. In another embodiment, the user causes to store the one or more media items and one or more associated comments at the UE 101, at the services platform 111, at the content provider 115 and the like. For example, the user has an image of a restaurant's building, which may be associated with one or more user comments and/or one or more user rankings. In another embodiment, the user has a media item which includes an image of a restaurant's building along with other images (e.g., image of a shop next to the restaurant) wherein the user causes to store portion of the media item which has the image of the restaurant's building and one or more associated comments and/or rankings.

Next, at step 307, the services platform 111 determines the one or more requests from the at least one user, one or more other users, or a combination thereof. In one embodiment, the one or more requests are from a user requesting information related to the one or more media items wherein the determination can indicate location of the user, one or more user information (e.g., user identity, user social networking group, user device type, etc.)

At step 309, the applications 107 causes, at least in part, a presentation of the commenting information, the one or more media items, the one or more portions of the one or more media items, or a combination thereof. In one embodiment, a media item and its associated commenting information are presented at the UE 101, wherein the media item and the associated commenting information may be retrieved from the UE 101, the services platform 111 and/or the content provider 115. For example, a user has and/or retrieves an image of a coffee shop, which he visited several weeks ago and which he associated with one or more comment and/or ranking information and wherein the image and/or the comment information may be presented to the user, to one or more other users, to a service provider, to a content provider, to a social networking site and the like. In another embodiment, the one or more portions of the one or more media items and/or one or more portions of the commenting information may be presented. For example, a user has a media item which includes several images (e.g., of a bookstore, a car, a restaurant, a gym, etc.) and associated one or more commenting information (e.g. related to the bookstore) wherein only the image of the bookstore and any related commenting information is presented (e.g., to the user, to one or more other users, to a service provider, etc.)

Figure 4:
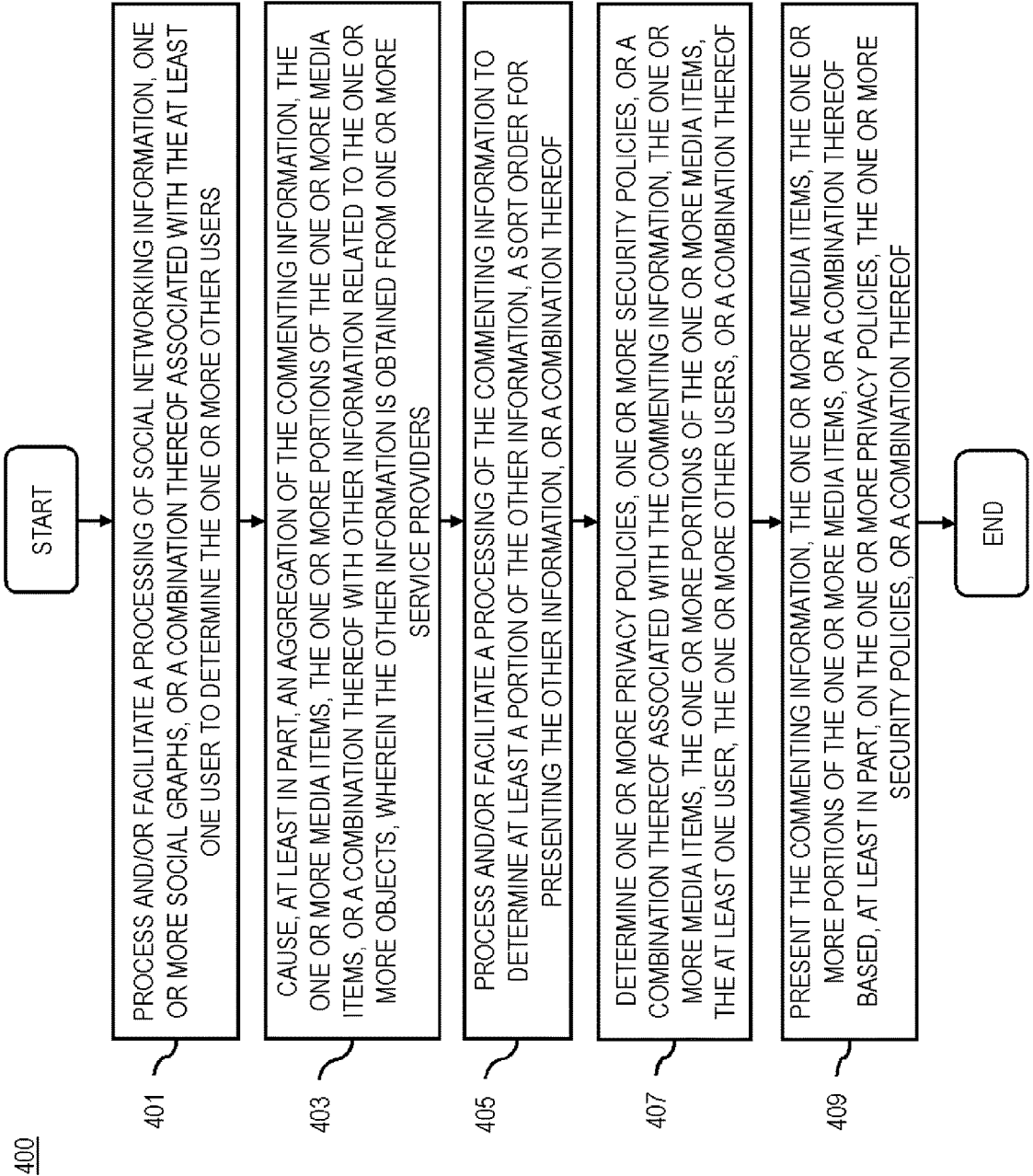
FIG. 4 is a flowchart of a process for processing social network information to determine one or more other users, according to one embodiment.

FIG. 4 is a flowchart of a process for processing social network information to determine one or more other users, according to one embodiment. In one embodiment, the applications 107 and/or the services platform 111 performs the process 400 and is implemented in, for instance, a chip set including a processor and a memory as shown in FIG. 8. As such, the applications 107, the services platform and/or the control logic 201 can provide means for accomplishing various parts of the process 400 as well as means for accomplishing other processes in conjunction with other components of the UE 101 and/or location services platform 111.

At step 401, the applications 107 and/or the services platform 111 process and/or facilitate a processing of social networking information, one or more social graphs, or a combination thereof associated with the at least one user to determine the one or more other users. In one embodiment, user information may include social networking information, one or more social graphs, or a combination thereof which can be utilized to determine one or more other users and/or groups. For example, a user's information may indicate that the user is associated with a certain social networking group, or participates in an online group of limited users, or belongs to certain information gathering and sharing collective wherein one or more other users are identified and associated with the user.

At step 403, the applications 107 and/or the services platform 111 cause, at least in part, an aggregation of the commenting information, the one or more media items, the one or more portions of the one or more media items, or a combination thereof with other information related to the one or more objects, wherein the other information is obtained from one or more service providers. In one embodiment, a user possesses one or more media items and/or one or more portions of the one or more media items, containing one or more objects, which are associated with one or more commenting information and wherein the user can aggregate the above information, media and/or objects with other information obtained from one or more service providers. For example, a user utilizes UE 101 to capture an image of a bookstore near his office and associates a comment and a ranking with the image wherein the comments may relate to a selection of books, services, a café in the bookstore, live reading sessions, and the like. Further, the user may retrieve or already have prior other information, related to the bookstore, from one or more other users and/or one or more other service providers wherein the user may aggregate the image and the commenting information he has with that of the prior instances. One advantage in doing the aggregation could be a more complete and update to date image, information and/or ranking.

Then, at step 405, the applications 107 and/or the services platform 111 process and/or facilitate a processing of the commenting information to determine at least a portion of the other information, a sort order for presenting the other information, or a combination thereof. In one embodiment, the available commenting information (e.g., by user, by service provider, by other users, aggregated, etc.) is processed in order to determine its possible attributes such as source of the information, date of the information, permissions associated with the information (e.g., private, personal, share with select user, share widely, etc.) and the like. For example, one or more portions of available commenting information related to an image may be for personal use while one or more other portions may be available for sharing/distribution. In one use scenario, John may wish to share with his brother his comments/rankings associated with a new restaurant in the area while wishing to keep those comments private and allow his friends experience the new restaurant for themselves and then compare comments/rankings.

At step 407, the applications 107 and/or the services platform 111 determine one or more privacy policies, one or more security policies, or a combination thereof associated with the commenting information, the one or more media items, the one or more portions of the one or more media items, the at least one user, the one or more other users, or a combination thereof. In various embodiments, a user and/or a service provider may associate one or more privacy and/or security policies with one or more media items, one or more portions of the one or more media items, a user, one or more other users and the like. In one embodiment, a user may register the privacy/security policies in UE 101 for future reference when accessing the media and/or information items. Furthermore, in step 409, use and/or sharing of a media item and/or commenting information may be limited to a certain user or group of users. For example, only members of a certain club may utilize interior images of the club facilities which may be available on a network resource (e.g., a server), but may be marked as restricted for the members' use only. In another embodiment, commenting information/rankings and/or images (e.g., by a user, by a service provider) may be available to members of a certain group (e.g., on a social networking site) or to those users who will enroll for certain services (e.g., an informational service, searching service, social networking services, etc.) In another embodiment, a user and/or a service provider may provide one or more portions of the media item, image commenting information and/or the rankings. For example, a latest rankings (e.g., within one month from a current date) may be reserved for paid member services and/or friends of a user providing the information wherein older rankings, information, images, media may be available to all users making such requests.

Figure 5:
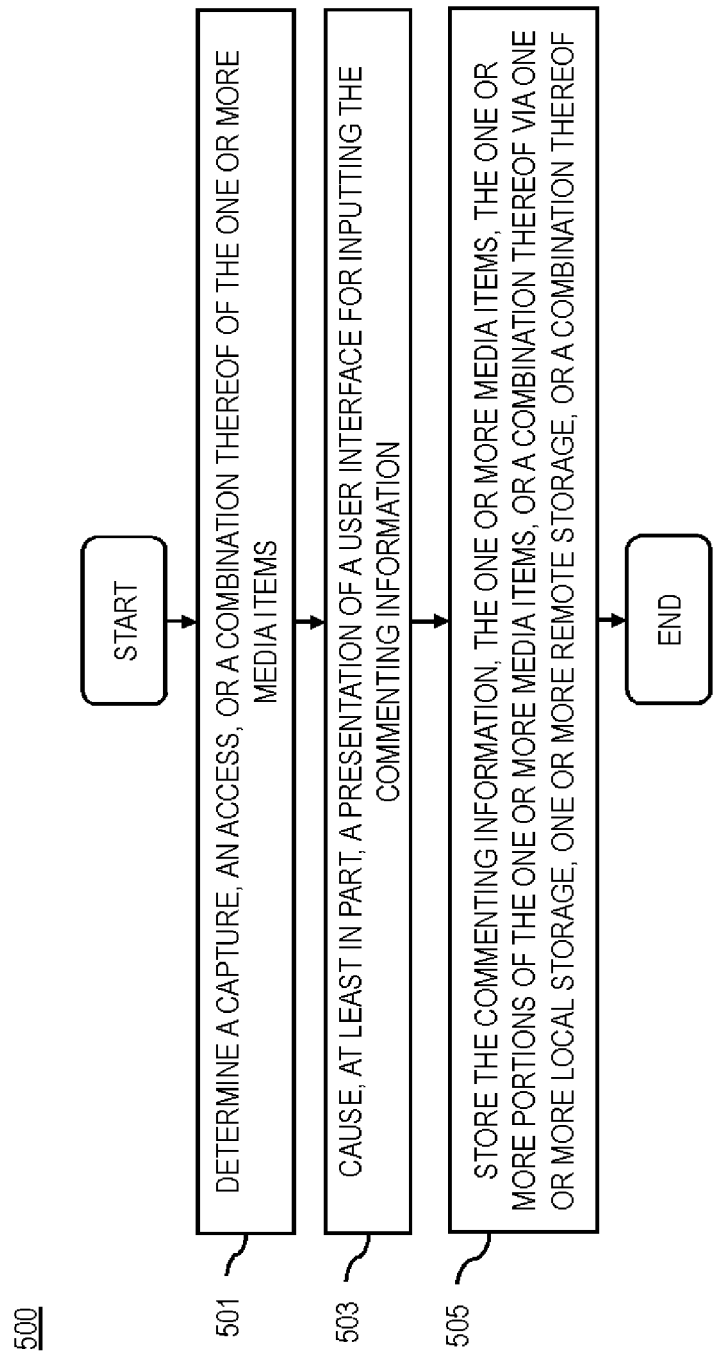
FIG. 5 is a flowchart of a process for determining a capture and/or an access of one or more media items, according to one embodiment.

FIG. 5 is a flowchart of a process for determining a capture and/or an access of one or more media items, according to one embodiment. In one embodiment, the applications 107 and/or the services platform 111 performs the process 500 and is implemented in, for instance, a chip set including a processor and a memory as shown in FIG. 8. As such, the applications 107, the services platform and/or the control logic 201 can provide means for accomplishing various parts of the process 500 as well as means for accomplishing other processes in conjunction with other components of the UE 101 and/or location services platform 111.

At step 501, the applications 107 and/or the services platform 111 determine a capture, an access, or a combination thereof of the one or more media items. In various embodiments, a user may utilize the UE 101 to capture the one or more media items, to retrieve the one or more media items from a local (e.g., user map and content data 117), from a remote storage device content catalog 109b, receive it from another user, and/or from other sources available to the user wherein the retrieval can include a transmission of a request for the one or more media items and a receipt of the one or more media items. In another embodiment, a user may access the image at the services platform 111 without having to download the image to the UE 101. For example, a user interface via applications 107 may present on the UE 101 display a media item whereby the user may indicate (e.g., by pointing, selecting, highlighting, etc.) one or more images in the media items as a target for processing. In another embodiment, a user may receive the media item from another user.

Then, at step 503, the applications 107 cause, at least in part, a presentation of a user interface for inputting the commenting information. In one embodiment, a GUI can be presented to the user via a display of the UE 101 whereby the user can associate/input (e.g., attach, write, select, highlight, paste, etc.) commenting information related to the one or more media items. For example, the user may write commenting information in a text area associated with the media item as well as selecting a ranking (e.g., three stars) for the media item. Further, the GUI can present to the user a view of the image, commenting information, ranking and the like before the user chooses to store (e.g., locally or remotely) the media item and any associated commenting information wherein the commenting information includes a ranking, one or more comments, a numerical grade, a textual grade, or a combination thereof. For example, a user may associate (e.g., "very good service") comments, assign a numerical ranking (e.g., 3 out of 5, 4 stars, in top 5%), a letter grade (e.g., A, B, F). In another embodiment, the commenting information and rankings maybe associated with different aspects of the target (e.g., separated into different categories). For example, during his last trip to New York, John dined at a diner in where he had mixed feelings about his experience; however, not wishing to rank the entire experience in one ranking, he writes his comments about the experience (e.g., "good food, good prices, poor parking area, not enough room for customers, friendly staff, etc."), ranks the food "four stars", ranks the parking information "one star", ranks the staff "3 stars" and the like. In another embodiment, the commenting and/or ranking information may be presented and/or viewed in its entirety or by one or more portions thereof.

At step 505, the applications 107 and/or the services platform 111 store the commenting information, the one or more media items, the one or more portions of the one or more media items, or a combination thereof via one or more local storage, one or more remote storage, or a combination thereof. In various embodiments, a user and/or a service provider may choose/decide (e.g., how, when, where, etc.) on storage of the commenting information, the one or more media items, the one or more portions of the one or more media items. In one embodiment, a user may capture an image, associate commenting information with the image and store the image and the commenting information on the user device UE 101. In another embodiment, the user may choose to store one or more portions of the media item and/or the commenting information at a remote storage site such as the content catalog 109b, at services platform 111, at a communication network 105 node (e.g., a server), at one or more other user devices, and the like. In another embodiment, one or more portions of the information and the media item may be stored at multiple locations such as at the user device, at the content catalog 109b and at the services platform 111 whereby each storage location may have a different portion of the information and the media.

FIGS. 6A-6F are diagrams of user interfaces utilized in the processes of FIGS. 3-5, according to various embodiments.

Figure 6A:
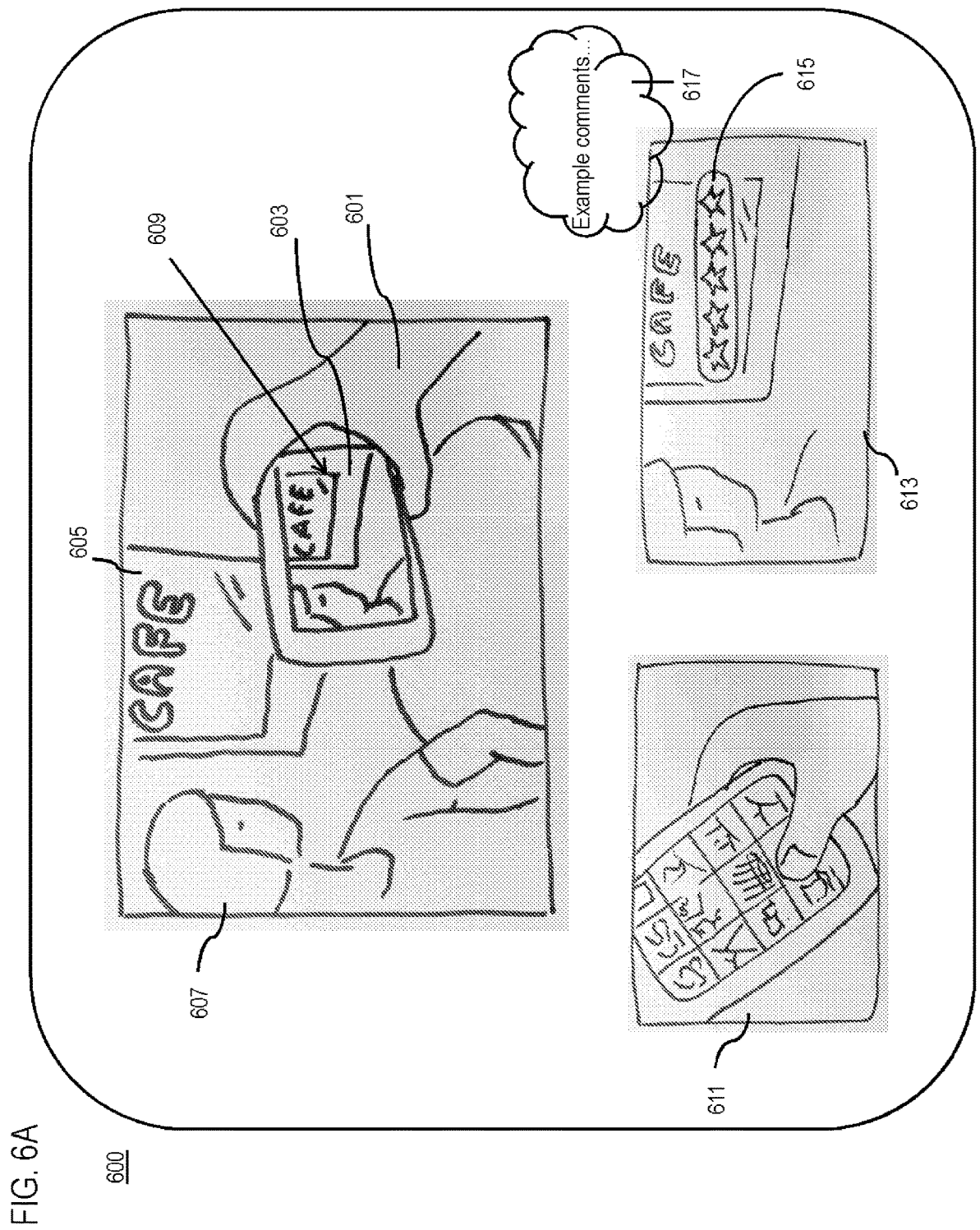
FIGS. 6A-6F are diagrams of user interfaces utilized in the processes of FIGS. 3-5, according to various embodiments.

FIG. 6A shows user interface 600 showing a user 601 utilizing a user device 603 to capture an image of a POI 605 (e.g., a café) wherein the image also includes an image of another item/object 607 (e.g., a person). In one embodiment, the user may identify (e.g., by selecting, highlighting, pointing to, etc.) the POI 609 as a target of an inquiry/search for one or more content items (e.g., information, location, etc.) related to the POI wherein the inquiry including the media item is sent 611 to a service provider (e.g., a search service). At 613, the user may be presented with one or more options for associating with the POI commenting information such as ranking 615 (e.g., assigning stars) and/or textual comments 617. In another embodiment, upon the user identifying the POI 609, the applications 107 may prompt the user to associate one or more commenting information.

Figure 6B:
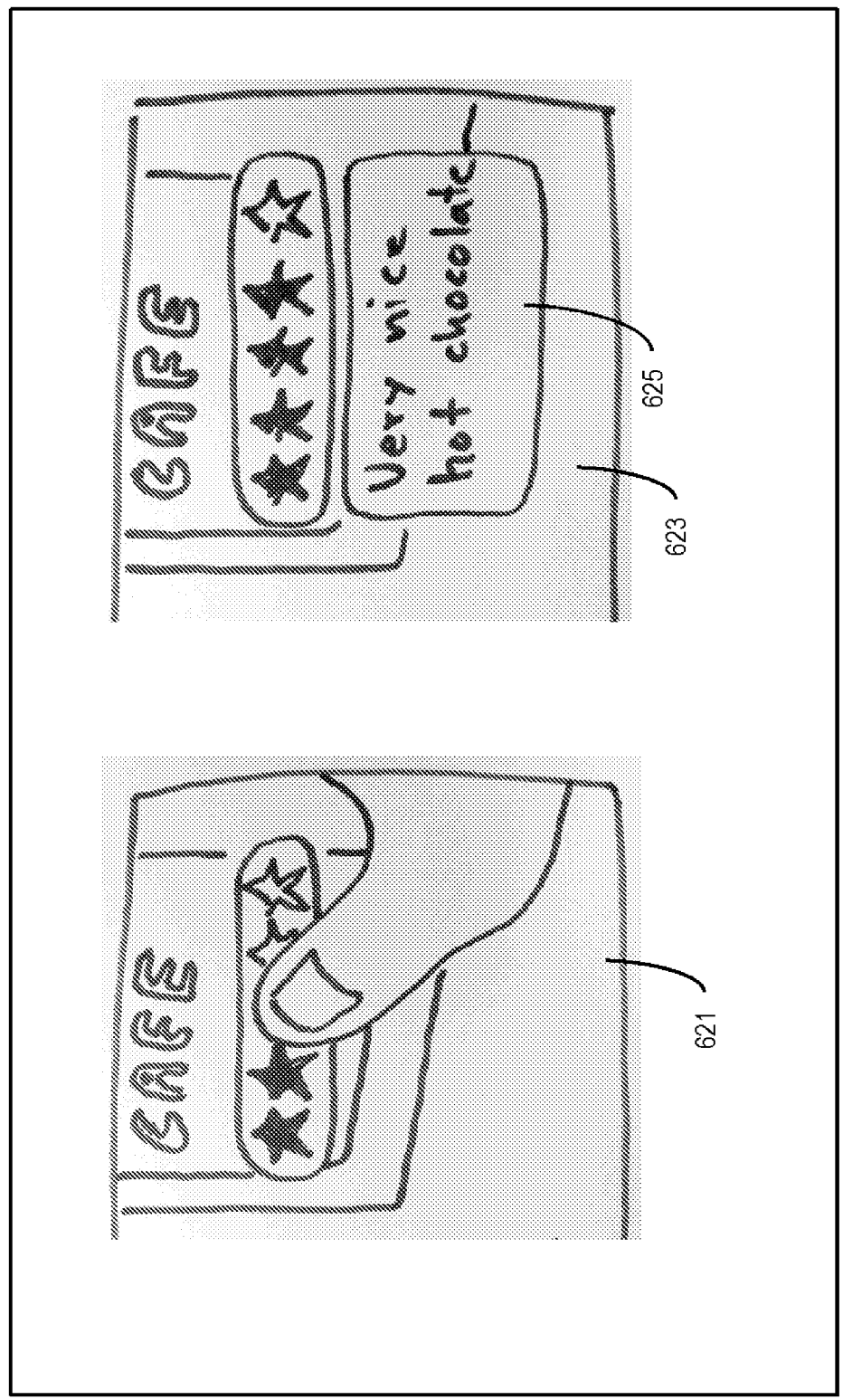

FIG. 6B shows an example user interface 620 showing commenting information 621 and 623 associated with a POI image. Indicator 621 shows an example ranking method utilizing "stars" to indicate a ranking value (e.g., 4 stars). Additionally, indicator 623 shows an example of additional textual comment (e.g., commentary) 625 (e.g., "very nice hot chocolate") associated with the POI and the ranking determined by the user. In one embodiment, commenting information are superimposed on the media item wherein the user may further edit the comments and the ranking. In various embodiments, the user may choose to store one or more portions of the media item and/or the commenting information at a local storage at the user device, store it at a service provider storage device, and store it at a content provider storage device or a combination thereof. In another embodiment, the user and/or a service provider may associate one or more security and/or privacy policies with one or more portions of the one or more media items and/or the one or more associated commenting information. In another embodiment, a user review and/or retrieve one or more media items wherein one or more associated commenting information is presented along with the one or more media items. In certain embodiments, the one or more media items including one or more POIs can be associated with an image of another media item (e.g., picture in a magazine, picture in an ad, picture on a building, etc.)

Figure 6C:
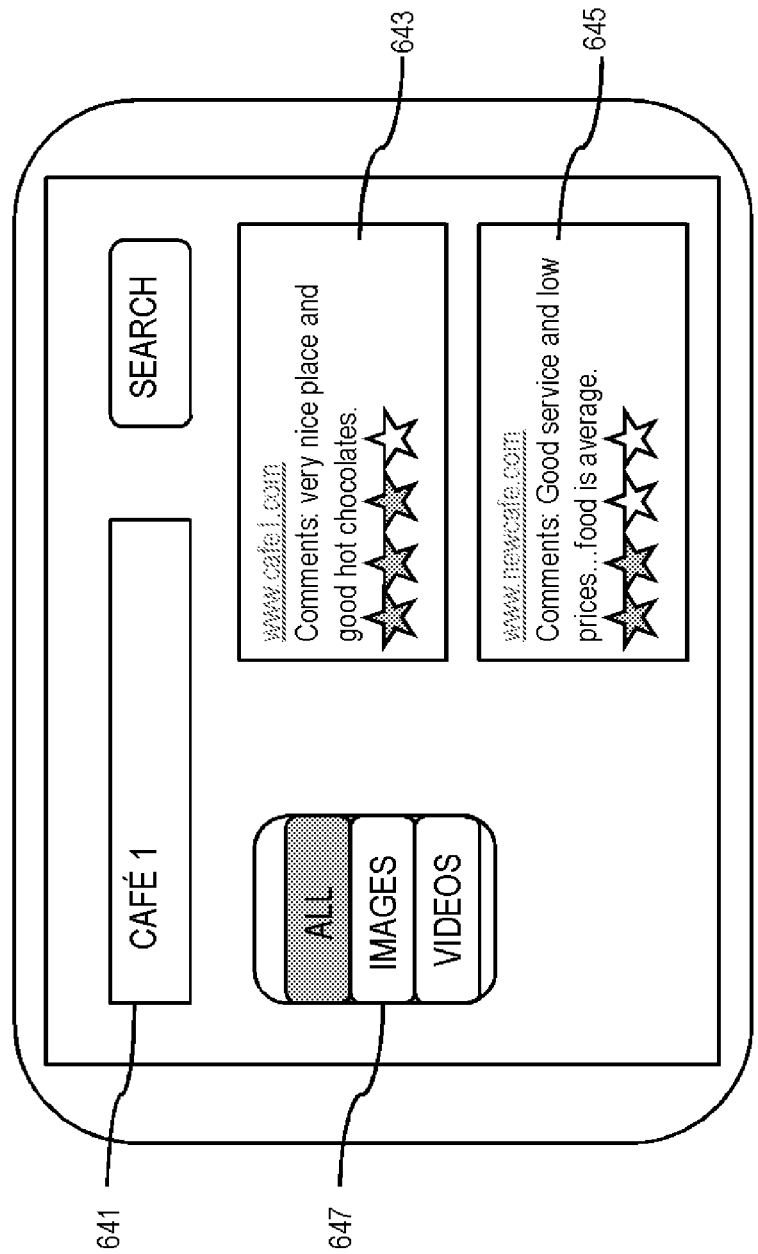

FIG. 6C is an example user interface 640 showing search results and related information for the "CAFÉ" in FIG. 6A. In a use scenario, user John requests from a service provider for content and/or information related to cafe 641 wherein the search may be based, at least in part, on a location, name of the "café", category, ranking and the like. Further, the search results 643 and 645 presented include one or more information items and one or more commenting information wherein the commenting information may be by one or more users associated with John (e.g., a friend, a social networking contact, a family member, etc.). Furthermore, John may choose to view one or more information items 647 available with the search results.

Figure 6D:
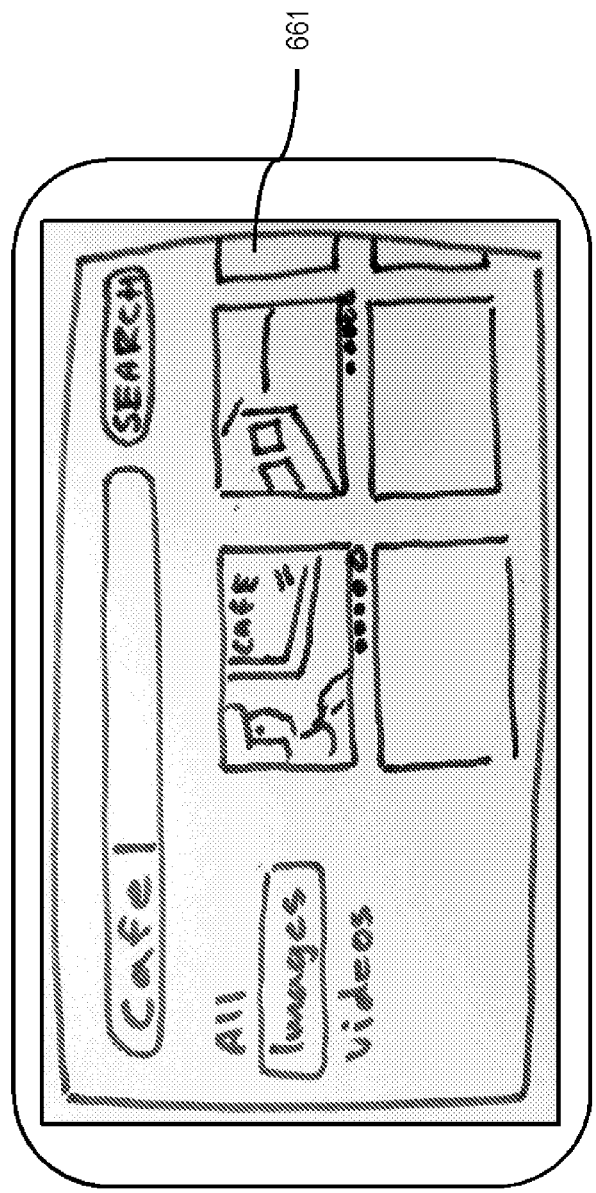

FIG. 6D shows another example user interface 660 showing a view of the search results which may include one or more public (e.g., on the internet) and user owned (e.g., from user's local and/or remote storage device) information items 661.

Figure 6E:
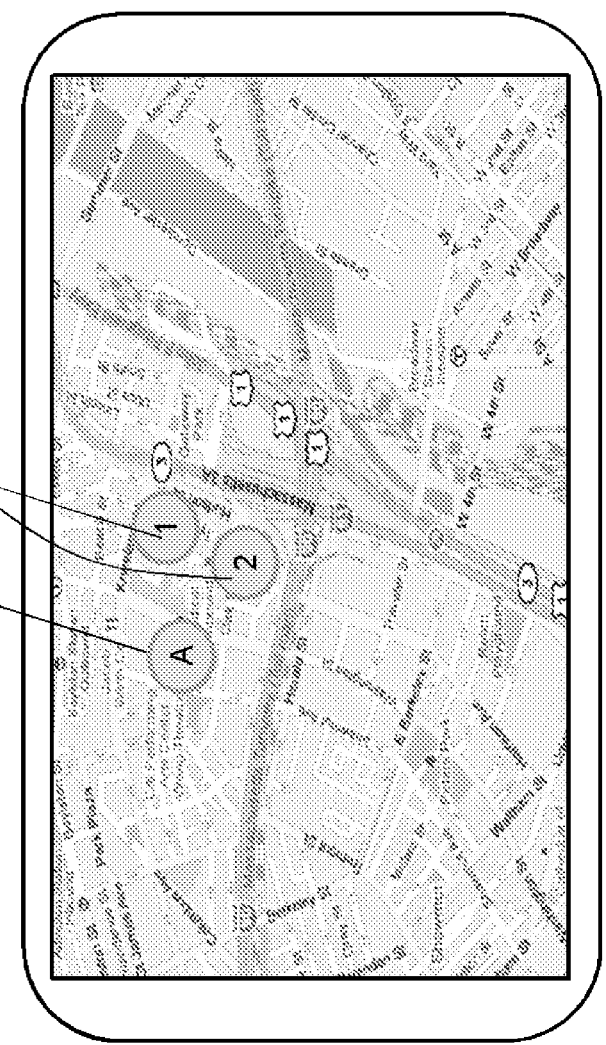
Figure 6F:
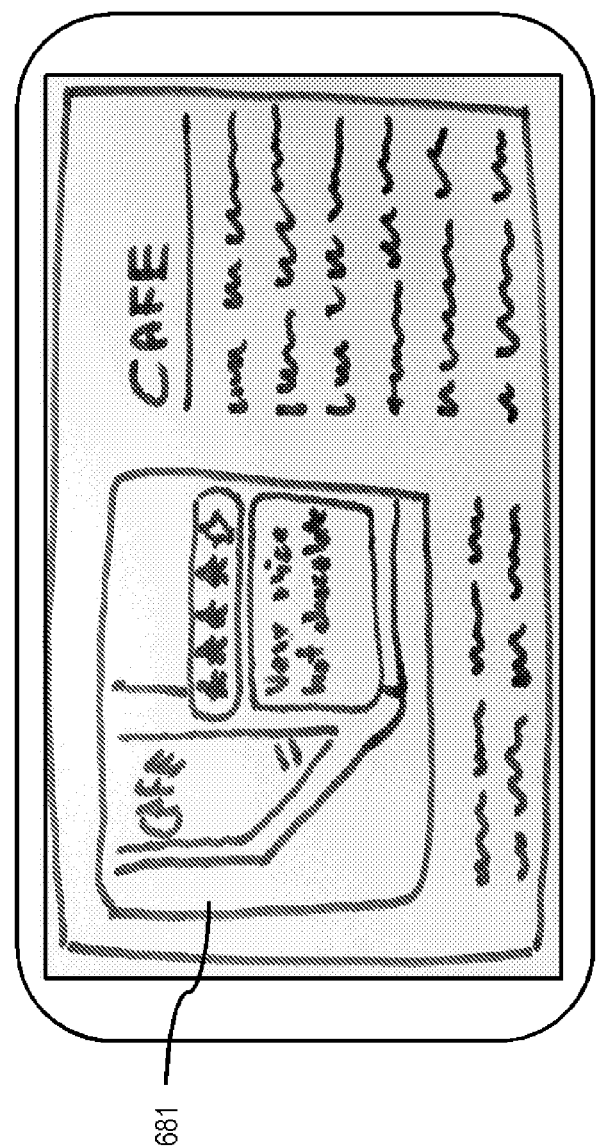

FIG. 6E shows a user interface showing a view of mapping application wherein one or more recommendations 673 (e.g., on restaurants) may be presented to a user "A" based on user "A" location which may include one or more information items (e.g., commenting/ranking information) and which may be further based on one or more recommendations by one or more other users (e.g., friends, social networking contacts, etc.). Further, the one or more information items may include one or more media items available on the internet and/or from the one or more other users. FIG. 6F shows an example user interface 680 showing another view of the "CAFÉ" image in FIG. 6A. In one embodiment, a user may utilize one or more images of a POI (e.g., of a building) which may include one or more different views of the POI (e.g., different angles) to request one or more content and/or information items associated with the POI. In various embodiments, the application 107, a service and/or a content provider can detect one or more portions of the POI included in the one or more different views and can superimpose one or more other available images, one or more available content items, one or more commenting and/or ranking information.

The processes described herein for presenting a user interface for associating one or more commenting information with on one or more content items detected in one or more media items may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
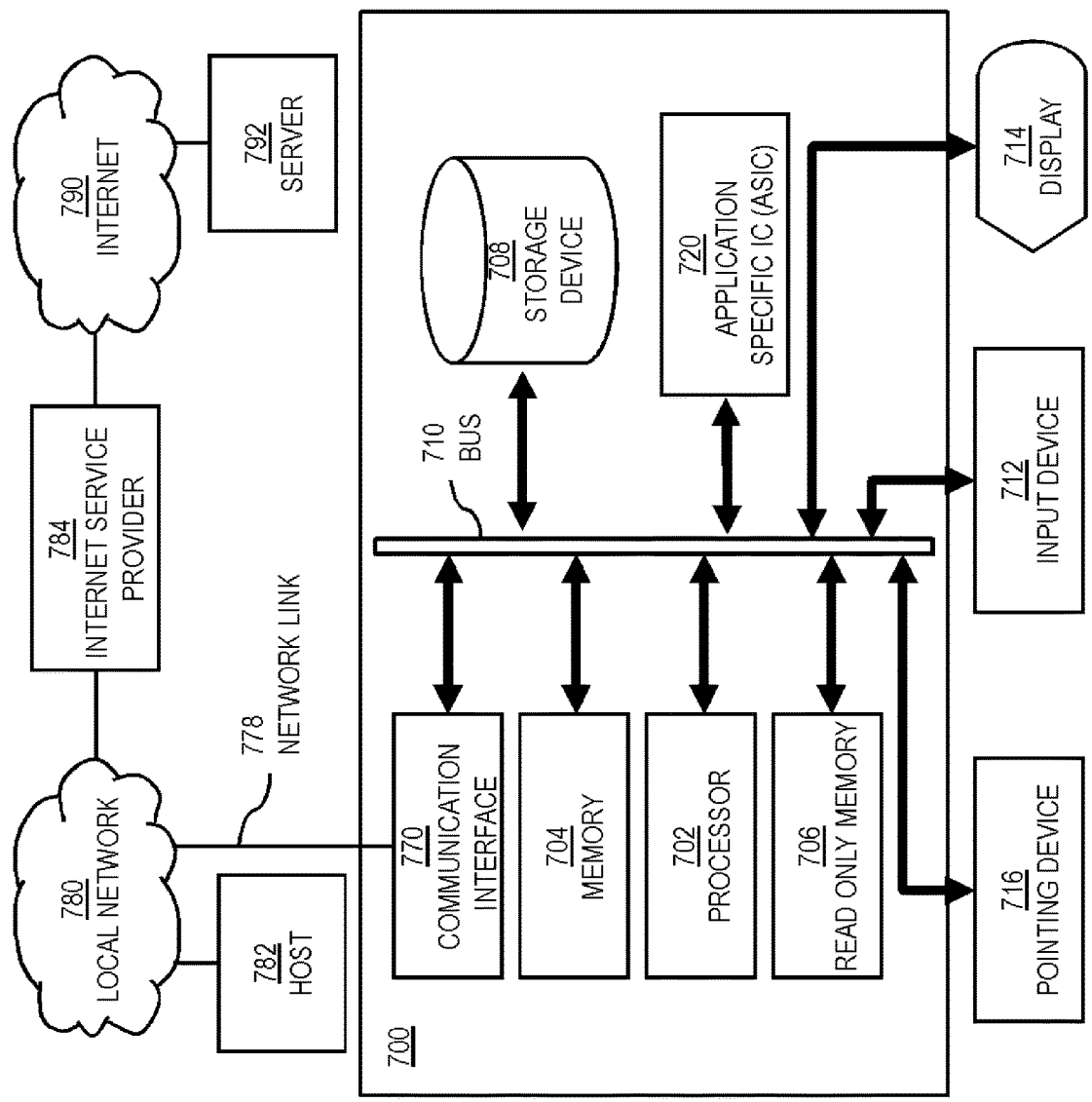
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to associate one or more commenting information with on one or more content items detected in one or more media items as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of associating one or more commenting information with on one or more content items detected in one or more media items.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to associating one or more commenting information with on one or more content items detected in one or more media items. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for associating one or more commenting information with on one or more content items detected in one or more media items. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for associating one or more commenting information with on one or more content items detected in one or more media items, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for communication to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to associate one or more commenting information with on one or more content items detected in one or more media items as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of associating one or more commenting information with on one or more content items detected in one or more media items.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to associate one or more commenting information with on one or more content items detected in one or more media items. The memory 805 also stores the data associated with or generated by the execution of the inventive steps.

Figure 9:
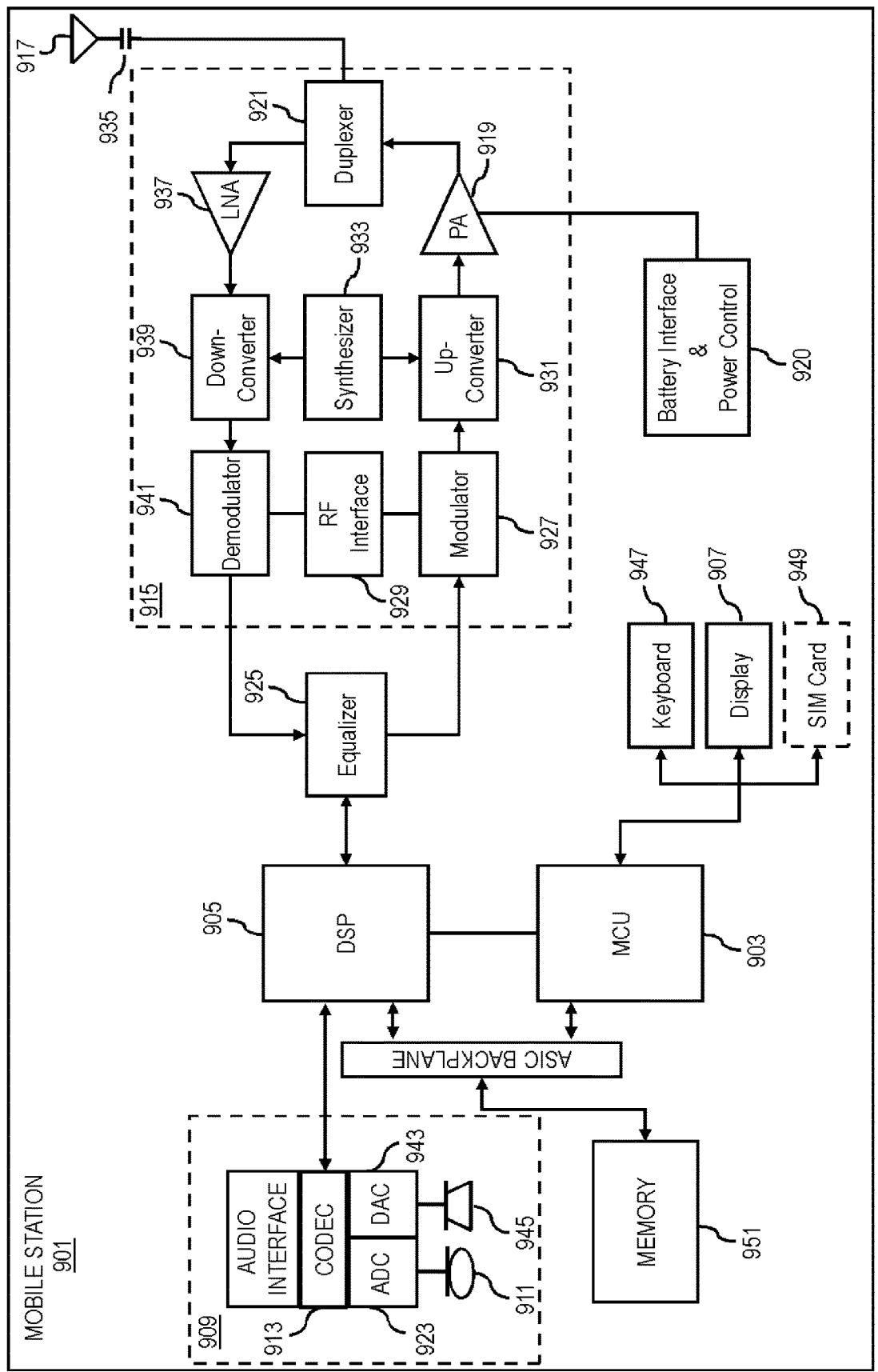
FIG. 9 is a diagram of a mobile terminal (e.g., handset) that can be used to implement an embodiment of the invention.

FIG. 9 is a diagram of exemplary components of a mobile terminal or station (e.g., handset) for communications, which is capable of operating in the system of FIG. 1, according to one embodiment. In some embodiments, mobile terminal 901, or a portion thereof, constitutes a means for performing one or more steps of associating one or more commenting information with on one or more content items detected in one or more media items. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of associating one or more commenting information with on one or more content items detected in one or more media items. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to associate one or more commenting information with on one or more content items detected in one or more media items. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus, comprising:
 at least one processor; and at least one memory comprising computer program code for one or more programs, the at least one memory and the computer program code configured to, with the at least one processor, cause the apparatus to perform at least the following:
 receive an indication of at least one of a capture of one or more media items in a live camera view captured with a camera as directed by a first user at a first location;
 receive mapping information from the camera at the first location;

process, using at least the mapping information, at least the one or more media items to cause a detection and identification of one or more point of interest (POI) objects in the one or more media items;

in response to the detection and identification of the one or more POI objects in the one or more media items from the live camera view, retrieve commenting information from another device, provided by a second user and identified as associated with the one or more detected and identified POI objects;

in response to retrieving the commenting information, cause the commenting information to be visually associated with at least the one or more detected and identified POI objects; and cause provision of a panoramic view to the first user at the first location, captured by another camera as directed by another user, wherein the panoramic view is associated with the detected and identified POI objects, and is from a different view point than a view point of the live camera view.

2. The apparatus of claim 1, wherein the live camera view comprises at least a streaming broadcast;

wherein the one or more media items comprises at least one of an image of a target, an image on an object, an image of a building, a map, or the POI; and wherein the mapping information comprises at least one of a set of geographic coordinates, latitude and longitude, an address, geo-tagged data, triangulation system data, or combination thereof.

3. The apparatus of claim 2, wherein the at least one memory and the computer program code are further configured to, with the at least one processor, cause the apparatus to:

cause display of the one or more detected and identified POI objects in the one or more media items as respective thumbnail images overlaid on a user interface map in locations corresponding to the respective POIs or portions of the POIs.

4. The apparatus of claim 1, wherein the commenting information comprises at least one of a ranking, one or more comments, a numerical grade, a textual grade, or a combination thereof; and wherein the mapping information comprises digital maps, location coordinates, prerecorded views, geo-tagged data, POI data, or a combination thereof; and wherein the retrieval of commenting information from the another device comprises at least a search one of at least a search engine, a social network, or an informational service.

5. The apparatus of claim 1, wherein the at least one memory and the computer program code are further configured to cause the apparatus to receive a selection of the one or more detected and identified POI objects via the user interface, wherein the association of the one or more commenting information with the one or more selected detected and identified POI objects is based on the selection.

6. The apparatus of claim 1, wherein the at least one memory and the computer program code are further configured to, with the at least one processor, cause the apparatus to perform at least the following:

receive an indication of an additional media item from another live camera view;

cause a detection and identification of one or more POI objects in the additional media item from the another live camera view; and in response to the detection and identification of the one or more detected and identified POI objects in the additional media item from the live camera view, cause the commenting information to be augmented onto another user interface displaying the another live camera view.

7. The apparatus of claim 1, wherein the at least one memory and the computer program code are further configured to, with the at least one processor, cause the apparatus to:

record and store, on a server, the live camera view with the augmented commenting information.

8. The apparatus of claim 1, wherein the capture or the access of one or more media items comprises a set of sound data; and wherein the live camera view captured with the camera is a live sound recording captured with a microphone as directed by a first user.

9. A computer program product comprising at least one non-transitory computer-readable storage medium having computer-executable program code instructions stored therein, the computer-executable program code instructions comprising program code instructions to:

receive an indication of at least one of a capture of one or more media items in a live camera view captured with a camera as directed by a first user at a first location;

receive mapping information from the camera at the first location;

process, using at least the mapping information, at least the one or more media items to cause a detection and identification of one or more point of interest (POI) objects in the one or more media items;

in response to the detection and identification of the one or more POI objects, performed based on at least the mapping information, in the one or more media items from the live camera view, retrieve commenting information from another device, provided by a second user and identified as associated with the one or more detected and identified POI objects;

in response to retrieving the commenting information, cause the commenting information to be visually associated with at least the one or more detected and identified POI objects; and cause provision of a panoramic view to the first user at the first location, captured by another camera as directed by another user, wherein the panoramic view is associated with the detected and identified POI objects, and is from a different view point than a view point of the live camera view.

10. The computer program product of claim 9, wherein the user interface presents an augmented reality view of a physical environment of the first user.

11. The computer program product of claim 9, wherein, the computer-executable program code instructions further comprise program code instructions to:

receive an indication of an additional media item from another live camera view;

cause a detection and identification of one or more POI objects in the additional media item from the another live camera view; and in response to the detection and identification of the one or more detected and identified POI objects in the additional media item from the live camera view, cause the commenting information to be augmented onto another user interface displaying the another live camera view.

12. A method comprising:

receiving an indication of at least one of a capture of one or more media items in a live camera view captured with a camera as directed by a first user at a first location;

receiving mapping information from the camera at the first location;

processing, using at least the mapping information, at least the one or more media items to cause a detection and identification of one or more point of interest (POI) objects in the one or more media items;

in response to the detection and identification of the one or more POI objects, performed based on at least the mapping information, in the one or more media items from the live camera view, retrieving commenting information from another device, provided by a second user and identified as associated with the one or more detected and identified POI objects;

in response to retrieving the commenting information, causing the commenting information to be visually associated with at least the one or more detected and identified POI objects; and causing provision of a panoramic view to the first user at the first location, captured by another camera as directed by another user, wherein the panoramic view is associated with the detected and identified POI objects, and is from a different view point than a view point of the live camera view.

13. The method of claim 12, further comprising:

receiving an indication of an additional media item from another live camera view;

causing a detection and identification of one or more POI objects in the additional media item from the another live camera view; and in response to the detection and identification of the one or more detected and identified POI objects in the additional media item from the live camera view, causing the commenting information to be augmented onto another user interface displaying the another live camera view.

14. The method of claim 12, further comprising:

processing of social networking information, one or more social graphs, or a combination thereof associated with the first user to determine the at least one different user.

15. The method of claim 14, further comprising:

causing an aggregation of the commenting information, the one or more media items, the one or more portions of the one or more media items, or a combination thereof with other information related to the one or more POI objects; and wherein the other information is obtained from the at least one different user.

16. The method of claim 15, further comprising:

processing of the commenting information to determine at least a portion of the other information, a sort order for presenting the other information, or a combination thereof.

17. The method of claim 12, further comprising:

determining privacy information associated with the commenting information, wherein the privacy information is provided by the at least one different user, and the privacy information identifies at least another user or user group to which the commenting information and the one or more media items is accessible; and wherein the presentation of the commenting information, the one or more media items, the one or more portions of the one or more media items, or a combination thereof is based on the privacy information.

18. The method of claim 12, further comprising:

wherein the commenting information includes, at least in part, a ranking, one or more comments, a numerical grade, a textual grade, or a combination thereof, and wherein the mapping information includes digital maps, location coordinates, prerecorded views, geo-tagged data, POI data, or a combination thereof.

19. The method of claim 12, further comprising:

storing of the commenting information, the one or more media items, the one or more portions of the one or more media items, or a combination thereof via one or more local storage, one or more remote storage, or a combination thereof.

\* \* \* \* \*